Oct. 3, 1933.                G. L. KNOX                1,928,900
                         UNIVERSAL ATTACHMENT
                    Filed April 21, 1930      2 Sheets-Sheet 1
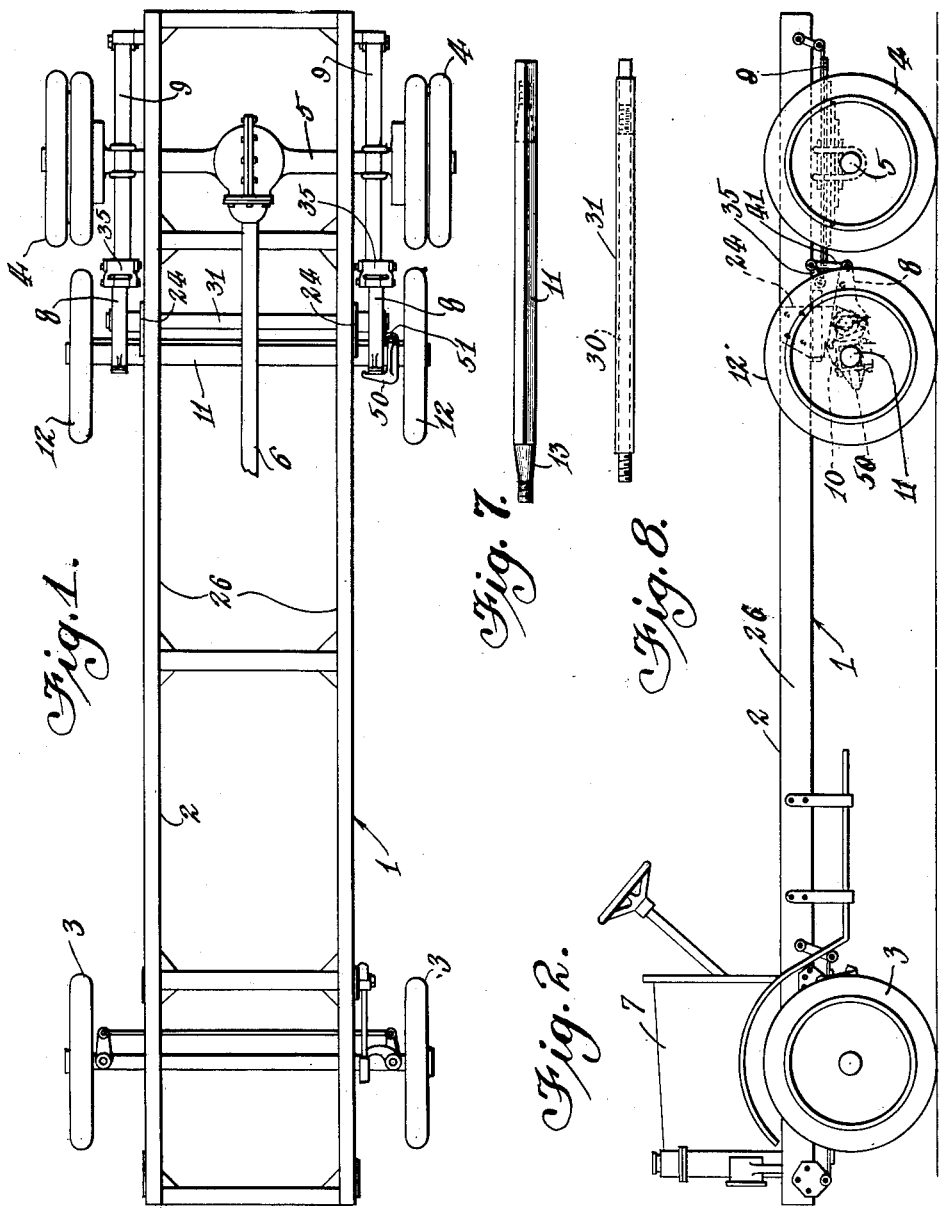
Inventor
Garner L. Knox
By Lyon & Lyon
Attorneys Oct. 3, 1933.  G. L. KNOX  1,928,900
UNIVERSAL ATTACHMENT
Filed April 21, 1930   2 Sheets-Sheet 2
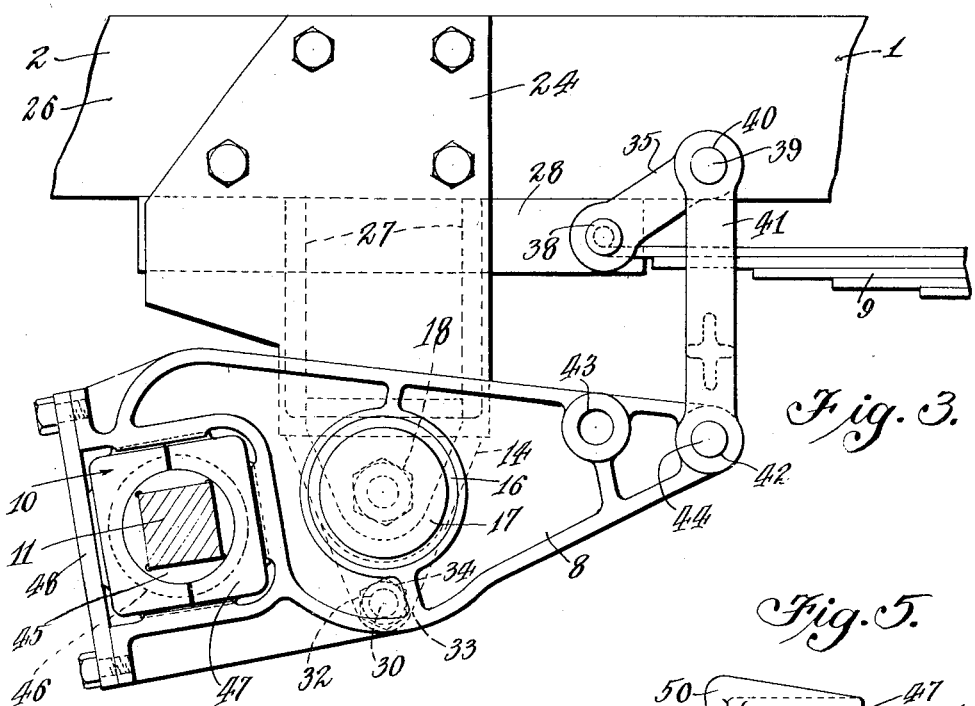
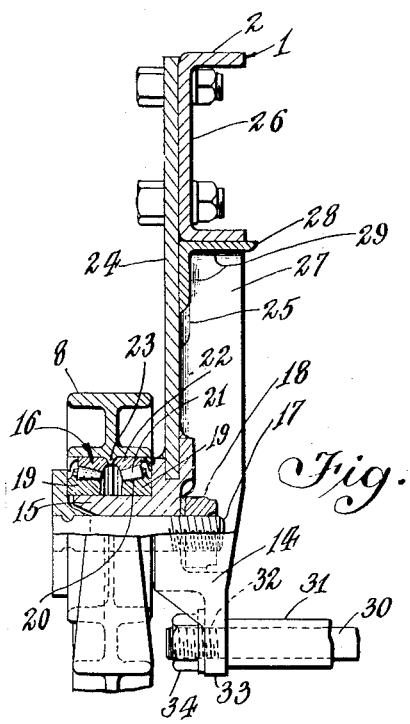
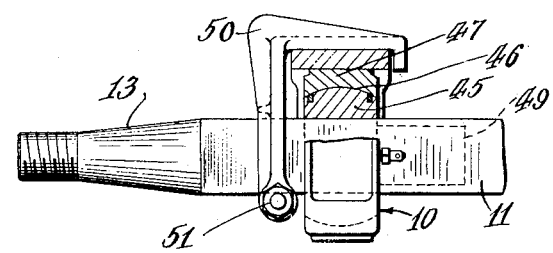
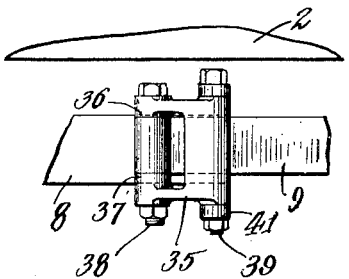
Inventor
Garner L. Knox
By Lyon & Lyon
Attorneys Patented Oct. 3, 1933

1,928,900

UNITED STATES PATENT OFFICE 1,928,900

UNIVERSAL ATTACHMENT

Garner L. Knox, Glendale, Calif., assignor to Six Wheel Corporation, Los Angeles, Calif., a corporation of California Application April 21, 1930. Serial No. 445,969

2 Claims. (Cl. 280—104)

This invention relates to universal attachments, and more particularly to an attachment for adding wheels to a motor vehicle either forwardly or rearwardly of the vehicle drive axis to form what is commonly referred to as a six wheel truck, the added wheels being so connected to the drive wheels of a truck as to distribute the load between the drive wheels and the attachment wheels, and which is of universal applicability to trucks of different makes, widths, heights from the road and spring assemblies, enabling the attachment to be constructed at a central manufacturing plant and distributed to dealers and to be installed by dealers with a minimum of alteration upon said trucks of diverse specifications as to width, height of frame and spring assemblies.

Prior to applicant's invention, the manufacture of six wheel attachments for motor vehicles had been greatly limited due to wide-spread variations existing in trucks or motor vehicles of different manufacture as to height of frame from the ground, width of frame of the motor vehicle and spring suspensions, making it practically essential to construct a special job or attachment for each installation. This has of necessity greatly increased the cost of such an attachment to the user as it has increased the cost of manufacture.

It is an object of this invention to provide a six wheel attachment of such construction that the same is adapted to be applied with a minimum of alteration or change to the chassis of any motor vehicle truck, and which is so constructed that the changes or work of applying the same to a motor vehicle truck is so simple that it can be performed by persons unskilled in manufacturing and with a minimum of labor cost.

Other objects and advantages of this invention it is believed will be apparent from the following detailed description of a preferred embodiment thereof as illustrated in the accompanying drawings.

In the drawings:

Figure 1 is a top plan view of a motor vehicle having a six wheel attachment embodying my invention attached thereto.

Figure 2 is a side elevation thereof.

Figure 3 is a detached enlarged side elevation of the attachment embodying my invention.

Figure 4 is a sectional end elevation thereof.

Figure 5 is an elevation of the attachment axle assembly embodying my invention illustrating the manner of connecting of the rocker, or equalizer, arms thereto.

Figure 6 is a fragmental plan view of the spring shackle assembly embodied in my invention.

Figure 7 is an elevation of an axle embodied in this invention illustrating in dotted lines the finished axle.

Figure 8 is a side elevation of the tie rod connecting the brackets embodied in this invention.

In the preferred embodiment of my invention illustrated in the accompanying drawings, 1 indicates the chassis of a motor vehicle truck including a frame 2, forward wheels 3, which are customary steering wheels of a motor vehicle and support the forward end of the frame 2. Drive wheels 4, mounted upon a drive axle 5, supports the rear end of the frame 2 and the rear wheels 4 and drive axle 5 thereof are driven by means of a drive shaft 6 of the motor 7 of the motor vehicle.

The attachment embodying my invention includes a pair of rocker arms 8 which are adapted to be connected at one end to the springs 9 which support the drive axle 5. The springs 9 are pivotally secured at their opposed ends in any suitable manner to the frame 2.

The opposite ends of the rocker arms 8 are secured by means of universal joints 10 to the attachment axle 11. The universal joints are mounted directly in the ends of the rocker arms 8 in a manner similar to that disclosed in my co-pending application Serial No. 158,560, filed January 3, 1927. Attachment wheels 12 are journaled on spindles 13 formed on the ends of the attachment axle 11.

In order to support the rocker arms 8, brackets 14 are provided. The brackets 14 are formed with trunnions 15 upon which bearings 16 are mounted, and the rocker arms 8 are journaled on bearings 16. Rocker arms 8 are held in position by means of bolts 17 which are passed axially through the trunnions 15 and held in position by means of a nut 18. The bolts 17 engage and hold the bearing assembly 16 in position upon the trunnion 15.

The bearings 16 as herein illustrated provide thrust bearings to take the side thrust from the rocker arms 8. The bearing 16 includes a pair of bearing rings 19 providing inclined bearing races 20 on which beveled rollers 21 are mounted. A pair of spaced thrust rings 22 are fitted over the rollers 21 and at their inner adjacent edges contract a spaced flange 23 formed integral with the rocker arm 8. The thrust rings are formed with inclined ways to engage the beveled bearings 21 and hence transmit the side thrust from the flange 23 to the beveled rollers 21.

Means are provided for securing the brackets 14 to frames 2 of vehicles of different heights, which means preferably includes face plates 24 which are secured to the brackets 14 in recesses 25 formed in the brackets 14. The face plates 24 are then welded or otherwise secured in position. The face plates 24 should be of sufficient vertical extent to engage the sides of the channel irons 26 of a channel iron frame chassis.

Formed integral with the brackets 14 are vertically extending ribs 27 which are spaced from the face plates 24 for the major portion of the length. The ribs 27 extend vertically a height from the brackets 14 sufficient to permit the attachment of the brackets 14 to the frame of any channel iron frame truck.

The ribs 27 are adapted to be cut off to the desired length, depending on the height of the truck from the ground and size of tires to be used on the attachment wheels as will hereinafter be described. Secured to the end of the ribs 27 after they have been cut to length is an angle iron bed plate 28, the vertical flange of which fits between the ribs 27 and face plate 24, and the horizontal flange of which provides the bearing plate for the channel iron of the frame and is supported on the ends of the ribs 27. The angle iron 28 is then welded to the face plate 24 and to each rib 27 as indicated at 29, and the ribs 27 are for the remainder of their length welded to the face plates 24.

The means for securing the brackets 14 together on trucks of varying widths includes the tie rods 30 which are made of sufficient width to accommodate all trucks. The tie rods 30 fit within pipes 31 also made of sufficient length to fit between the brackets 14 when installed on trucks of maximum width. The tie rods 30 are threaded on one end only and are left unfinished by the manufacturer on their opposite end. After the tie rod 30 has been cut to the correct length, it is threaded on its blank end by the distributor and the ends are inserted through eyes 32 formed in the depending portions 33 of the brackets 14 and threads with nuts 34.

In order to accommodate for different spacings of the springs 9 from the frame 2, I provide spring shackles 35 which are oversize in overall dimensions and are provided with inwardly extending cored bosses 36 and 37 in which the spring shackle pins 38 are carried. The spring shackles are pivotally mounted on pins 39 mounted in eyes 40 formed in the forks 41. The springs 9 extend through the forks 41 and are pivotally secured to the pins 38. The springs 9 may vary in width as well as spacing from the frame 2 so that the spacing of the cored bosses 36 and 37 must be varied for each installation of the attachment on trucks of different manufacture.

The bosses 36 and 37 therefore extend toward each other a distance greater than the narrowest spring and are formed eccentric. That is, the boss 36 extends inwardly toward the center of the shackle a lesser distance than does the boss 37. The two bosses are then cut off to accommodate the position and width of the spring 9 by the distributor.

In order to accommodate for different weight distribution between the attachment and drive wheels of the vehicle, I also provide a pair of adjustment holes 42 and 43 in the rocker arm 8 into either one of which the pin 44 on which the fork 41 is journaled may be positioned without necessitating the undue spacing of the attachment and drive wheels which, for good efficient operation, should be as close coupled as possible.

In order to permit the manufacturer to build a single construction which may be installed on any make of channel iron frame truck, and thereby require also the distributor to carry a minimum of stock on hand, the manufacturer also finishes only one end of the attachment axle 11 leaving the other end unfinished and makes the axles 11 of a maximum width required. The distributor will then cut the axle to the length required and will turn the spindle 13 on its end.

The universal joint connections 10 are made to slide freely on the axles 11 which is made square. A ring 45, having an arcuate bearing surface 46, is fitted on the axle 11, and fits within a socket 47 formed of two halves and held in position by a plate 48 substantially as illustrated in my co-pending application heretofore referred to.

If additional adjustment for weight distribution is desired the two halves of socket 47 may be made of different widths so that the axle will be moved toward or away from the pivot point by reversing the halves.

In order to restrict the movement of the axle 11 lengthwise through the universal joints, blocks 49 are secured to the axle 11. The blocks 49 are welded to the axle 11 after the axle has been cut to length. The blocks 49 serve as stops.

Mounted on the attachment axle 11 at one end only is a bracket 50 which engages the plate 48 and is slipped over the end of the axle 11 and held in position by means of a pin passed through eyes 51 formed in the bracket 50. The bracket 50 is loose-fitted on the attachment axle 11 and fits the square portion of the axle 11 to prevent rotation of the axle 11 within the universal joint but fits the axle 11 and the plate 44 sufficiently loose to allow free movement of the assembly in every way except to permit the axle 11 to rotate in the universal joint.

The attachment of my invention may be manufactured at a low manufacturing cost and is applicable for installation on any truck and the cost of handling the attachment is less to the distributor because of the limited stock that he is required to maintain to make any and all installations. Each installation also is perfectly made and fitted to the truck as though manufactured to the exact specifications.

Having fully described my invention, it is to be understood that I do not wish to be limited to the details herein set forth, but my invention is of the full scope of the appended claims.

I claim:

1. In a device of the class described, the combination of an attachment axle having wheels thereon, rocker arms pivotally connected with the frame of the vehicle, a drive axle, side springs supporting said drive axle and connected at one end with the frame, spring shackles connected with the rocker arms and provided with pins to which the opposite ends of said springs are pivotally secured, and bosses on said shackles extending towards each other and surrounding said pins, said bosses extending inward towards the center of each shackle different distances, whereby the longer of said bosses may be cut off to accommodate the position and width of the spring ends connected with said pins.

2. In a device of the class described, the combination of an axle carrying wheels, a drive axle carrying wheels, rocker arms, and side springs, means for connecting one end of each rocker arm to the first-mentioned axle, means for connecting the other ends of said rocker arms to said springs, brackets carrying trunnions for pivotally supporting said rocker arms, and plates rigidly secured to the side frames, said brackets being secured to said plates and provided with means thereon to abut against the lower flange of a channel truck-frame member.

GARNER L. KNOX.